US008860474B2

(12) United States Patent
Chu et al.

(10) Patent No.: US 8,860,474 B2
(45) Date of Patent: Oct. 14, 2014

(54) CONTROL CIRCUIT AND METHOD FOR SENSING AN ELECTRODE ARRAY AND TOUCH CONTROL SENSING SYSTEM USING THE SAME

(75) Inventors: Chun-Hsueh Chu, Hsinchu (TW); Jui-Jung Chiu, Zhudong (TW)

(73) Assignee: TPK Touch Solutions Inc., Taipei (TW)

(*) Notice: Subject to any disclaimer, the term of this patent is extended or adjusted under 35 U.S.C. 154(b) by 16 days.

(21) Appl. No.: 13/482,974

(22) Filed: May 29, 2012

(65) Prior Publication Data

US 2013/0027091 A1    Jan. 31, 2013

(30) Foreign Application Priority Data

Jul. 29, 2011   (CN) .......................... 2011 1 0221714

(51) Int. Cl.
*H03L 7/00* (2006.01)
*G06F 3/041* (2006.01)
*G06F 3/044* (2006.01)

(52) U.S. Cl.
CPC .............. *G06F 3/0416* (2013.01); *G06F 3/044* (2013.01)
USPC ............................ 327/141; 375/376; 327/156

(58) Field of Classification Search
USPC .............. 327/141, 144–163; 331/1/A, 15–17; 375/373–376
See application file for complete search history.

(56) References Cited

U.S. PATENT DOCUMENTS

| 5,867,111 A | 2/1999 | Caldwell et al. | |
| 2002/0159554 A1* | 10/2002 | Nosaka et al. | 375/376 |
| 2011/0074476 A1* | 3/2011 | Heer et al. | 327/156 |

FOREIGN PATENT DOCUMENTS

| JP | 04-297131 | 10/1992 |
| JP | 06-311033 A | 11/1994 |
| JP | 2010-108501 | 5/2010 |
| JP | 2011-065614 | 3/2011 |
| JP | 2011/065614 | 3/2011 |
| JP | 2011-175452 | 9/2011 |
| TW | M379806 U1 | 5/2010 |

* cited by examiner

*Primary Examiner* — Brandon S Cole
(74) *Attorney, Agent, or Firm* — Gokalp Bayramoglu (57) ABSTRACT

A control circuit for a sensing electrode array is described. The control circuit for the sensing electrode array includes a signal intensity analyzer, an intensity-to-phase frequency converter, and a phase frequency analyzing unit. The signal intensity analyzer obtains an intensity signal corresponding to a sensing signal of each sensing line of the sensing electrode array, wherein each intensity signal is a direct-current signal. The intensity-to-phase frequency converter generates a phase frequency signal based on the intensity signal. At least the phase or the frequency of the phase frequency signal is related to the level of the corresponding intensity signal. The phase frequency analyzing unit obtains a signal magnitude of the corresponding sensing line according to each phase frequency signal. The control circuit for the sensing electrode array enhances the operating speed and the signal-to-noise ratio of the touch control sensing system without increasing the manufacturing cost.

18 Claims, 9 Drawing Sheets

CONTROL CIRCUIT AND METHOD FOR SENSING AN ELECTRODE ARRAY AND TOUCH CONTROL SENSING SYSTEM USING THE SAME

BACKGROUND OF THE INVENTION

This application claims the benefit of the People's Republic of China Application No. 201110221714.1, filed on Jul. 29, 2011.

FIELD OF THE INVENTION

The instant disclosure relates to a touch control sensing system; more particularly, to a control circuit and a method for sensing an electrode array in a touch control sensing system, and a touch control sensing system using the same.

DESCRIPTION OF THE RELATED ART

Touch control sensing systems have been widely used for various touch display systems. Touch panels of all sizes can be found in everyday applications. For example, smart phones use small touch panels, while ATMs use medium-sized touch panels.

Touch panels are mainly either of resistive type or of capacitive type. However, regardless which type, each touch panel requires a sensing electrode array and a control circuit for the sensing electrode array so as to detect presence of the touched area of the touch panel.

Figure 1:
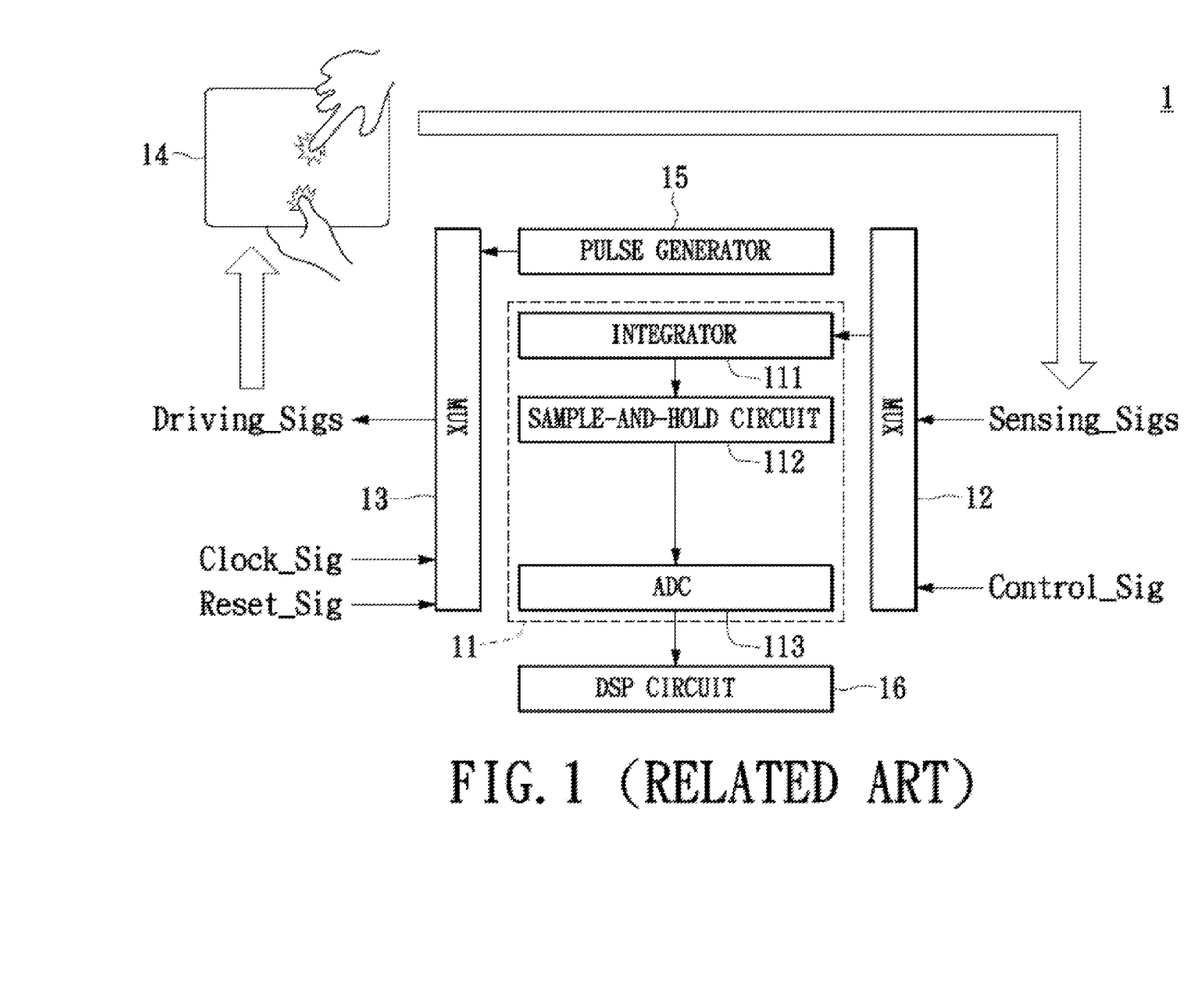
FIG. 1 shows a function block diagram of a conventional control circuit for a sensing electrode array.

Please refer to FIG. 1, which shows a function block diagram for a conventional touch control sensing system. A conventional control sensing system 1 comprises a control circuit 11 for a sensing electrode array, a plurality of multiplexors (MUX) 12 and 13, a touch panel 14, a pulse generator 15, and a digital signal processing (DSP) circuit 16. The pulse generator 15 is connected to the MUX 13, wherein the MUX 13 is connected to the touch panel 14. The touch panel 14 also connects to the MUX 12, and the MUX 12 and the DSP circuit 16 are connected to the conventional control circuit 11 for the sensing electrode array 11.

The MUX 13 receives pulse signal provided by the pulse generator 15. The MUX 13 also receives a clock signal Clock_Sig and a reset signal Reset_Sig. According to the trigger of the clock signal, the MUX 13 transmits pulses of the received pulse signal in sequence to a plurality of output ports thereof. The pulses of the output ports are exported as a plurality of driving signals Driving_Sigs. The output ports of the MUX 13 are connected to driving lines of the touch panel 14 respectively. The driving signals Driving_Sigs are transmitted to the respective driving lines of the touch panel 14. In addition, the reset signal Reset_Sig resets the MUX 13 to export the driving signal Driving_Sig beginning with the first output port again.

The touch panel 14 includes driving lines and sensing lines to form the sensing electrode array. The driving lines are for receiving driving signals, while the sensing lines are for outputting sensing signals. The driving lines can be arrayed in columns; with the sensing lines in rows, or vice versa. In short, the driving lines and the sensing lines are arrayed in an intersectional manner without conducting each other, so as to form the sensing electrode array. Due to field coupling, the driving signals of the driving lines induce the sensing lines to generate sensing signals. When the touch panel 14 is touched, the sensing signals of the sensing lines of the touched area would change.

A plurality of input ports of the MUX 12 receive the sensing signals and a control signal. According to the control signal, the MUX 12 transmits each sensing signal in sequence to the conventional control circuit 11 for the sensing electrode array. In other words, each sensing signal is transmitted to the conventional control circuit 11 for the sensing electrode array at different times.

The conventional control circuit 11 for the sensing electrode array receives the sensing signals Sensing_Sigs, and obtains signal magnitude of the corresponding sensing line. More specifically, when a user touches the touch panel 14, at least some sensing signals Sensing_Sigs would change. Thereby, by the change of these sensing signals Sensing_Sigs, signal magnitudes of the sensing lines obtained by the conventional control circuit 11 for the sensing electrode array are different. Thereby, the back-end DSP circuit 16 can detect the signal variation of each sensing line between a presence and absence of a touch, so as to successful identify the touched area.

Figure 2:
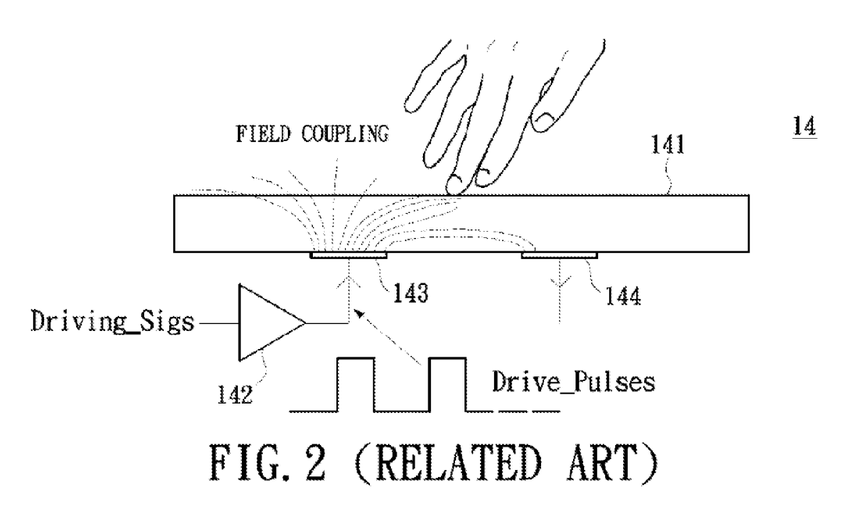
FIG. 2 shows a schematic view of a structure of a touch panel.

Please refer to FIG. 2, which shows structure of a touch panel 14. The touch panel 14 includes a panel 141, a drive buffer 142, a drive electrode 143, and a receive electrode 144. The drive buffer 142 receives the driving signals Driving_Sigs and generates drive pulses Drive_Pulses accordingly. The drive pulses Drive_Pulses are transmitted to the driving lines through the drive electrode 143. The sensing signals Sensing_Sigs are transmitted to the MUX 12 through the receive electrode 144.

When a human finger touches the touch panel 14, an electric field formed by some drive pulses Drive_Pulses would be coupled to the human finger due to field coupling. Thereby, when the human finger touches the panel 141, some sensing signals Sensing_Sigs would be different as opposed to when the panel 141 is untouched. Thus, by detecting the changes in sensing signals, the touched area of the touch panel 14 by the human finger can be identified.

Please refer back to FIG. 1, the conventional control circuit 11 for the sensing electrode array includes an integrator 111, a sample-and-hold circuit 112, and an analog-to-digital converter (ADC) 113. The integrator 111 is coupled to the sample-and-hold circuit 112, and the sample-and-hold circuit 112 is coupled to the ADC 113.

Figure 3:
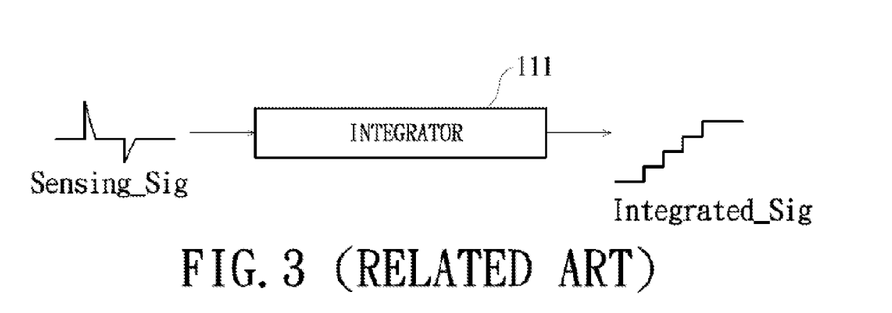
FIG. 3 shows waveforms of an input signal and an output signal of an integrator.

Function of the integrator 111 is shown in FIG. 3, which shows a waveform of an input signal and a waveform of an output signal of the integrator 111. The input sensing signal Sensing_Sig is integrated by the integrator 111 over a specified time period and output as an integrated signal Integrated_Sig. After the specified time period ends, the integrator 111 dumps the integrated signal Integrated_Sig.

Please refer back to FIG. 1, as the specified time period ends, the sample-and-hold circuit 112 samples and holds the integrated signal Integrated_Sig to output a sample-and-hold signal accordingly. The sample-and-hold signal is intensity value of the integrated signal Integrated_Sig at the end of the specified time period, which is a direct-current (DC) voltage signal substantially.

The ADC 113 converts an analog signal of each signaling channel of the sample-and-hold circuit 112 to a digital signal. The ADC 113 is a critical element of the conventional control circuit 11 for the sensing electrode array, wherein the ADC 113 affects the signal-to-noise ratio (SNR) of the conventional touch control sensing system 1.

Thermal noise and flicker noise of the conventional touch screen system 1 affects the DC voltage signal level adversely, thus lowering the SNR. As the supply voltage of the conventional touch control sensing system 1 reduces, the SNR also reduces. Therefore, the ADC 113 having a better performance is required to meet the SNR requirement. However, having a better performance is more expensive, and thus it may increase the manufacturing cost of the conventional touch screen system 1.

Furthermore, parasitical resistances and capacitances on the signal paths of medium or large touch panels are greater than those of the small touch panels. Accordingly, the conventional touch control sensing systems with the medium or large touch panels have greater noises and charge transfer losses. In other words, the conventional touch control sensing systems with the medium or large touch panels have smaller SNRs.

A digital-to-analog converter (DAC) for baseline is often included in the conventional control circuit for the sensing electrode array having the ADC, such that the overall SNR increases. However, change in DC voltage signal level is small for the touch panel after being touched, and the DC voltage signal is prone to affected by noise interference. Therefore, the increase in SNR is limited.

Further still, the integrator 111 is also easily affected by noise interference, and thus, the SNR of the touch control sensing system is difficult to increase. Moreover, the integrator 111 has long processing time, wherein each calculation takes 24~40 µs. Thus, the operating speed of the touch control sensing system is difficult to enhance.

SUMMARY OF THE INVENTION

One aspect of the instant disclosure provides a control circuit for a sensing electrode array of a touch control sensing system, to resolve the issues of slow operating speed and low SNR without increasing the manufacturing cost.

The control circuit for a sensing electrode array comprises a signal intensity analyzer, an intensity-to-phase frequency converter, and a phase frequency analyzing unit. The signal intensity analyzer obtains a corresponding intensity signal according to a sensing signal of each sensing line of the sensing electrode array, wherein each intensity signal is substantially a DC signal. The intensity-to-phase frequency converter generates a corresponding phase frequency signal according to each intensity signal, wherein at least the frequency or the phase of each phase frequency signal is related to the level of corresponding intensity signal. The phase-frequency analyzing unit obtains a signal magnitude of the corresponding sensing line according to each phase frequency signal.

Another aspect of the instant disclosure provides for a sensing electrode array being used in a touch control sensing system. First, a corresponding intensity signal is obtained according to the sensing signal of each sensing line of the sensing electrode array, wherein each intensity signal is substantially a DC signal. Next, a corresponding phase frequency signal is generated according to each intensity signal, wherein at least the frequency or the phase of the phase frequency signal is related to the level of corresponding intensity signal. Then, a signal magnitude of the corresponding sensing line according to each phase frequency signal is obtained.

A further aspect of the instant disclosure provides a touch control sensing system. The touch control sensing system includes a touch panel and the preceding control circuit for the sensing electrode array, wherein the touch panel has the sensing electrode array.

In summary, compared to the conventional touch control sensing system using the conventional control circuit for the sensing electrode array, the touch control sensing system using the preceding control circuit or method for the sensing electrode array of the instant disclosure has a higher SNR and faster operating speed than the conventional touch screen system. Since the touch control sensing system of the instant disclosure has a higher SNR, medium or large touch panel can be adopted by the touch control sensing system.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE EMBODIMENTS

Figure 4:
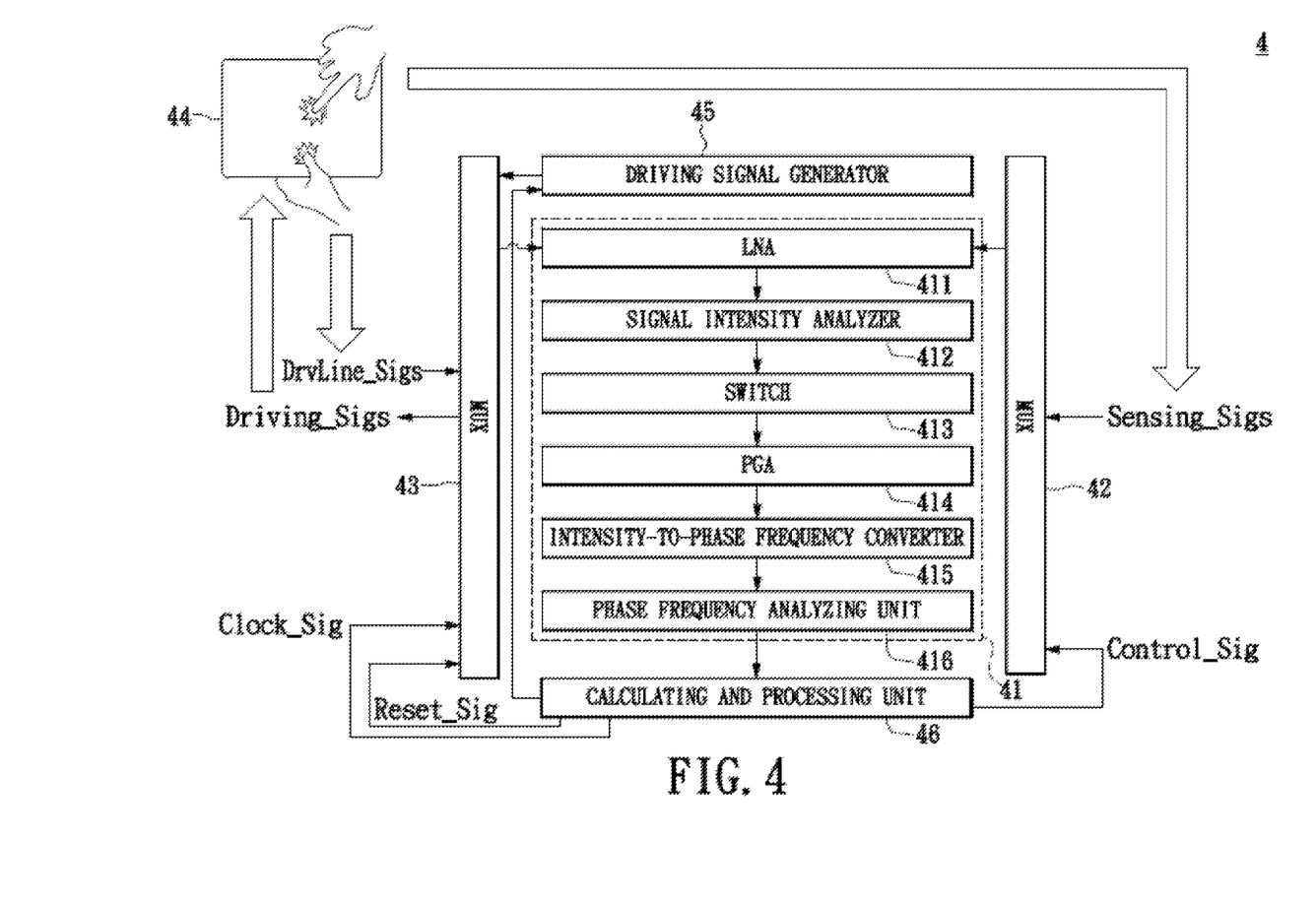
FIG. 4 shows a function block diagram of a touch control sensing system according to one embodiment of the present disclosure.

Please refer to FIG. 4, which shows a function block diagram of a touch control sensing system according to one embodiment of the present disclosure. A touch control sensing system 4 is adapted to be operated in multiple operation modes, wherein the tool for touching the touch panel may be a finger of a user, a passive stylus without providing any driving signal, or an active stylus which can provide a driving signal. The touch control sensing system 4 comprises a control circuit 41 for a sensing electrode array, multiplexors (MUXs) 42, 43, a touch panel 44, a driving signal generator 45, and a calculating and processing unit 46. The driving signal generator 45 is connected to the MUX 43, and the MUX 43 is connected to the touch panel 44. The touch panel 44 is also connected to the MUX 42, and the MUX 42 is connected to the control circuit 41 for the sensing electrode array. The calculating and processing unit 46 is connected to the MUXs 42, 43, the driving signal generator 45, and the control circuit 41 for the sensing electrode array.

In an embodiment, the type of tool used for touching the touch panel 44 can be determined by the calculating and processing unit 46. Thus, the calculating and processing unit 46 can enable or disable the driving signal generator 45, and control the MUX 43 to receive the driving line signal DrvLine_Sig of each driving line. When the tool for touching the touch panel 44 is a finger of a user or is a passive stylus, the driving signal generator 45 is enabled. When the tool for touching the touch panel is an active stylus, the driving signal generator 45 is disabled.

The calculating and processing unit 46, the driving signal generator 45, and the MUXs 42, 43 can be formed as a micro control unit (MCU). The control circuit 41 for the sensing electrode array and the MCU can be further integrated into a control chip set.

In addition, the calculating and processing unit 46 may detect if a user switches the type of tool used for touching the touch panel 44 to determine the type of tool being used at that moment for touching the touch panel. Further, the calculating and processing unit 46 may automatically detect the type of tool used for touching the touch panel by the other detection manners. For example, the calculating and processing unit 46 may determine the type of tool used for touching the touch panel by detecting the operation frequency or signal amplitude of the driving signal, wherein the operation frequencies or signal amplitudes of the driving signals of the different tools for touching the touch panel are different.

When the tool used for touching the touch panel 44 is a finger of a user or is a passive stylus, the driving signal generator 45 provides a sum signal of the driving signals Driving_Sigs to the MUX 43, which receives the sum signal. The MUX 43 also receives a clock signal Clock_Sig and a reset signal Reset_Sig. The MUX 43 outputs the driving signals Driving_Sigs of the sum signal in sequence to the output ports of the MUX 43 according to the clock signal Clock_Sig. The output ports of the MUX 43 are connected to the driving lines of the touch panel 44 respectively. The driving signals Driving_Sigs are transmitted to the driving lines of the touch panel 44 respectively. In addition, the reset signal Reset_Sig resets the MUX 43 to output the driving signals Driving_Sigs from the first output port again.

When the tool used for touching the touch panel is an active stylus, the MUX 43 receives the driving line signal DrvLine_Sig of each driving line, and transmits the driving line signal DrvLine_Sig of each driving line to the control circuit 41 for the sensing electrode array by the control of the calculating and processing unit 46. Furthermore, by the control of the calculating and processing unit 46, the MUXs 42, 43 transmit the sensing signals Sensing_Sigs of the sensing lines and the driving line signals DrvLine_Sigs of the driving lines in sequence to the control circuit 41 for the sensing electrode array at different times.

Notably, the driving signal Driving_Sig can be a pulse signal having periodic pulses, a periodic square-wave signal, a periodic sawtooth-wave signal, a sine-wave signal, a periodic triangular-wave signal, or any other type of periodic signal. To summarize, the type of driving signal is not restricted for the instant disclosure.

The touch panel 44 has a plurality of driving lines and a plurality of sensing lines to form a sensing electrode array. The driving lines are for receiving driving signals, while the sensing lines are for outputting sensing signals. The driving lines can be arrayed in columns, with the sensing lines in rows, or vice versa. In short, the driving lines and the sensing lines are arrayed in an intersectional manner without conducting each other, so as to form the sensing electrode array. Due to field coupling, the driving signals of the driving lines induce the sensing lines to generate sensing signals. When the touch panel 44 is touched, the sensing signals of the sensing lines of the touched area would change.

Input ports of the MUX 42 receive the sensing signals Sensing_Sigs, and the MUX 42 further receives a control signal Control_Sig. According to the control signal Control_Sig, the MUX 42 transmits each sensing signal Sensing_Sig in sequence to the control circuit 41 for the sensing electrode array. In other words, each sensing signal Sensing_Sig is transmitted to the control circuit 41 for the sensing electrode array at a different time. Furthermore, to enhance the overall operating speed of the touch control sensing system 4, the MUXs 42, 43 can be high speed MUXs. For example, a high speed MUX capable of processing a broadband signal of DC through 500 MHz.

Unlike the conventional control circuit for the sensing electrode array, the control circuit 41 for the sensing electrode array requires neither an integrator nor an ADC. In addition, the control circuit 41 for the sensing electrode array has a higher SNR. When the tool for touching the touch panel is a passive stylus or a finger of a user, the control circuit 41 for the sensing electrode array converts each sensing signal Sensing_Sig of medium or high frequency into an intensity signal of low frequency (substantially a DC voltage signal). For example, a peak detector is used to obtain a peak signal as the intensity signal, or an envelope detector is used to obtain an envelope signal as the intensity signal. When the tool for touching the touch panel is an active stylus, the control circuit 41 for the sensing electrode array converts the each sensing signal Sensing_Sig and each driving line signal DrvLine_Sig of medium or high frequency into the intensity signals of low frequency (substantially a DC voltage signal). Then, the control circuit 41 for the sensing electrode array generates a phase frequency signal according to the intensity signal of low frequency (substantially a DC voltage signal). The phase, frequency, or a combination of both, of the phase frequency signal would change according to the level of the intensity signal.

Afterwards, when the tool for touching the touch panel is a passive stylus or a finger of a user, the control circuit 41 for the sensing electrode array analyzes the phase frequency signal to obtain the signal magnitude of the corresponding sensing line, wherein the calculating and processing unit 47 at the back end determines the signal variation of each sensing line according to the corresponding signal magnitude, so as to determine the touched area of the touch panel 44. When the tool for touching the touch panel is an active stylus, the control circuit 41 for the sensing electrode array analyzes the phase frequency signal of the corresponding sensing line to obtain the signal magnitude of the corresponding sensing line, and analyzes the phase frequency signal of the corresponding driving line to obtain the signal magnitude of the corresponding driving line.

Next, further explanation is given herein for the components of the control circuit 41 for the sensing electrode array. The control circuit 41 for the sensing electrode array includes a low-noise amplifier (LNA) 411, a signal intensity analyzer 412, a switch 413, a programmable gain amplifier (PGA) 414, an intensity-to-phase frequency converter 415, and a phase frequency analyzing unit 416. The LNA 411 is coupled to the signal intensity analyzer 412, and the signal intensity analyzer 412 is coupled to the switch 413. The switch 413 is coupled to the PGA 414, and the PGA 414 is coupled to the intensity-to-phase frequency converter 415. The intensity-to-phase frequency converter 415 is coupled to the phase frequency analyzing unit 416. The following description about each component of the control circuit 41 for the sensing electrode array is based on an assumption that the tool for touching the touch panel is a passive stylus or a finger of a user. The condition that the tool for touching the touch panel is an active stylus can be referenced hereinafter. Therefore, no redundant description is given herein.

The touch control sensing system 4 can use at least one LNA 411 to amplify the sensing signal Sensing_Sig. For example, the LNA 411 can be a low-noise programmable gain amplifier for processing the broadband signal of DC through 500 MHz. Furthermore, if the touch control sensing system 4 is weak in detecting the sensing signal Sensing_Sig, more low-noise amplifiers can be added, or the gain of the LNA 411 can adjusted.

However, if the sensing signal Sensing_Sig has the low noise, and the intensity-to-phase frequency converter 415 and the phase frequency analyzing unit 416 have sufficient resolution, the LNA 411 can be replaced with a typical amplifier instead. Further still, if the sensing signal Sensing_Sig has the low noise and low decay, the LNA 411 can be removed from the control circuit 41 for the sensing electrode array.

The signal intensity analyzer 412 receives the amplified sensing signal Sensing_Sig, and converts the sensing signal Sensing_Sig of medium or high frequency to an intensity signal of low frequency (substantially a DC voltage signal). The signal intensity analyzer 412 can be a peak detector, while the intensity signal of low frequency can be a peak signal. Alternatively, the signal intensity analyzer 412 can be an envelope detector, while the intensity signal of low frequency can be an envelope signal.

Intensity signal outputted by the signal intensity analyzer 412 is similar to the output signal after the sensing signal has passed through the integrator and the sample-and-hold circuit, wherein they all are DC voltage signals substantially. However, when compared to the integrator, the signal intensity analyzer 412 has faster operating speed. Therefore, the operating speed of the touch control sensing system 4 can be raised effectively.

For example, if the signal intensity analyzer 412 is a peak detector, the processing time from the MUX 42 to the peak detector is usually less than 1 μs. The 1 μs processing time is far shorter than the time (24~40 μs) took by the integrator. Therefore, the operating speed of the touch control sensing system 4 is faster than that of the conventional touch control sensing system. In addition, it is noted that the signal intensity analyzer 412 can include a filter and an amplifier to filter and amplify the intensity signal.

The switch 413 delivers the intensity signals of the sensing lines to the corresponding signaling channels respectively. In other words, the next PGA 414, the intensity-to-phase frequency converter 415, and the phase frequency analyzing unit 416 all have multiple signaling channels, wherein each signaling channel corresponds to a sensing line.

The PGA 414 is an amplifier whose gain can be adjusted. The PGA 414 is used to amplify the intensity signal of each signaling channel, wherein the gain for each signaling channel may be different. Simply speaking, the PGA 414 is for adjusting the level of the DC voltage of the intensity signal (substantially a DC voltage signal), and then transmitting the adjusted intensity signal to the intensity-to-phase frequency converter 415. In addition, if the intensity-to-phase frequency converter 415 has sufficient sensitivity, the PGA 414 can be omitted from the control circuit 41 for the sensing electrode array.

The intensity-to-phase frequency converter 415 converts the intensity signal of each signaling channel to a phase frequency signal. The phase, frequency, or a combination of both, of the phase frequency signal would change according to the level of the intensity signal. For example, the intensity-to-phase frequency converter 415 can be a voltage-controlled oscillator (VCO). When the input intensity signal has the higher level, a phase frequency signal with higher frequency is outputted. When the input intensity signal has the lower level, a phase frequency signal with lower frequency is generated instead.

Notably, the intensity-to-phase frequency converter 415 is not limited to VCO only. For example, the intensity-to-phase frequency converter 415 can further be a phase modulator. If the level of the intensity signal for input is higher, a phase frequency signal of larger phase is outputted. If the level of the intensity signal for input is lower, a phase frequency signal with smaller phase is generated instead. The intensity-to-phase frequency converter 415 can even be a phase and frequency modulator for adjusting both the phase and frequency. When the level of the intensity signal for input is higher, a phase frequency signal with larger phase and higher frequency is outputted. If the level of the intensity signal for input is lower, a phase frequency signal with smaller phase and lower frequency is generated instead.

According to the communication theory, if a signal level is used to represent conveyed data, the conveyed data tends to be erroneous due to noise interference. The reason being that the level is easily affected by the noise interference. However, if the phase and frequency of the signal are adopted to represent the conveyed data, the conveyed data is less likely to be erroneous due to noise interference. The reason being that the phase and frequency are not affected easily by the noise interference.

The control circuit 41 for the sensing electrode array generates a phase frequency signal according to the intensity signal, wherein the phase, the frequency, or a combination of both, of the phase frequency signal would change according to the level of the intensity signal. Therefore, the information regarding the touched area is represented by the frequency, the phase, or a combination of both, of the phase frequency signal. Compared to the conventional touch control sensing system using the level of the sample- and hold signal to represent the information of the touched area, the touch control sensing system 4 has higher SNR.

For explaining purpose, the intensity-to-phase frequency converter 415 is allowed to be a VCO here. For example, the difference between the highest output frequency F2 and the lowest output frequency F1 is 8 MHz. The frequency offset Delta_F induced by the noise is 12.3 KHz.

When the touch panel 44 is untouched by a user, the level of DC voltage of the intensity signal is higher. Thus, the frequency of the phase frequency signal output by the VCO is F2. However, when the touch panel 44 is touched by the user, the sensing signals of the sensing lines of the touched area would change. The change would drop the level of DC voltage of the intensity signal. Thus, the VCO would output a phase frequency signal having a frequency of F1. By simple calculation, the SNR can reach up to 650 (SNR=(F2−F1)/Delta_F).

Therefore, compared to conventional touch control sensing system, the touch control sensing system 4 using the control circuit 41 for the sensing electrode array has higher SNR and faster operating speed. Since the touch control sensing system 4 has higher SNR, the touch panel 44 thereof can be medium or large-sized. Simply speaking, once the touch panel 44 is touched, the change in frequency of the phase frequency signal generated by the VCO is significant enough, which makes less vulnerable to noise effect. Thereby, the SNR is enhanced accordingly.

The phase frequency analyzing unit 416 analyzes each phase frequency signal to obtain corresponding signal magnitude of the corresponding sensing line. The calculating and processing unit 46 generates the control signal Control_Sig or the reset signal Reset_Sig, and determines the touched area on the touch panel 44 by detecting the signal variation of each sensing line according to each signal magnitude. In addition, the calculating and processing unit 46 can execute corresponding commands of the touched area, such as selecting the item of the touched area.

The phase-frequency analyzing unit 416 is implemented according to the implementation of the intensity-to-phase frequency converter 415. For example, if the intensity-to-phase frequency converter 415 is a VCO, the phase-frequency analyzing unit 416 can simply be a frequency counter or a more complicated frequency discriminator. If the intensity-to-phase frequency converter 415 is a phase modulator, the phase-frequency analyzing unit 416 can be a phase demodulator. If the intensity-to-phase frequency converter 415 is a phase and frequency modulator, the phase-frequency analyzing unit 416 can be a phase and frequency demodulator.

When the phase-frequency analyzing unit 416 is simply a frequency counter, frequencies of the phase frequency signals are measured, and thus the signal magnitude of the corresponding sensing line is obtained according to each phase frequency signal. The aforementioned switch 413 can also be omitted from the control circuit 41 for the sensing electrode array. Furthermore, the PGA 414, the intensity-to-phase frequency converter 415, and the phase-frequency analyzing unit 416 can process the signal of only one signaling channel. For such configuration, the phase-frequency analyzing unit 416 transmits signal magnitude of each sensing line in sequence to the calculating and processing unit 47.

In summary, because the intensity-to-phase frequency converter 415 has low phase noise, and the touch control sensing system 4 has a high SNR, the touch control sensing system 4 does not require a DAC for the baseline. The size of the touch panel 44 can be medium or large. Furthermore, the hardware cost of the intensity-to-phase frequency converter 415 is low, and thus the manufacturing cost can be saved.

Figure 5:
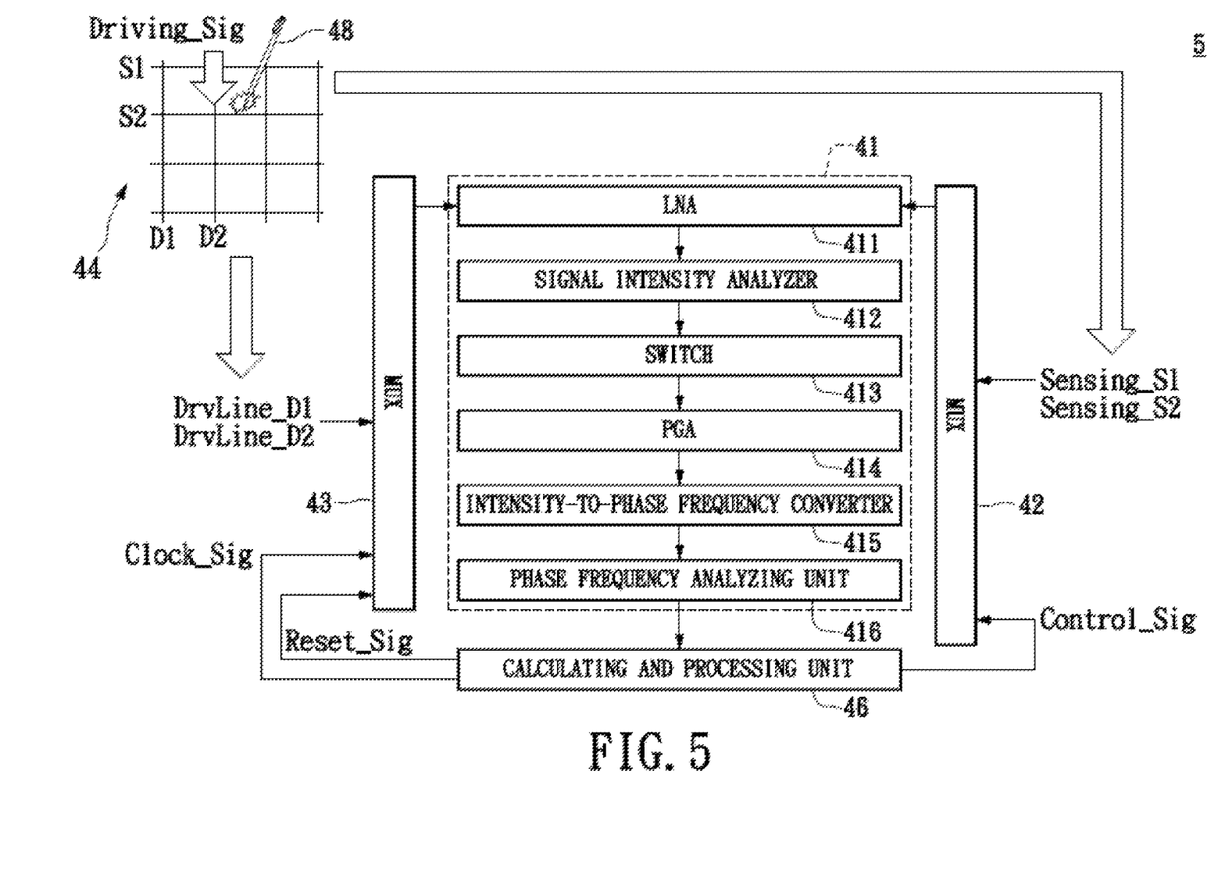
FIG. 5 shows an equivalent function block diagram of a touch control sensing system when the tool for touching the touch panel is an active stylus according to one embodiment of the present disclosure.

Please refer to FIG. 5, which shows an equivalent function block diagram of a touch control sensing system when the tool for touching the touch panel is an active stylus according to one embodiment of the present disclosure. When the tool for touching the touch panel is an active stylus 48, function block diagram of the touch control sensing system 4 is equivalent to the touch control sensing system 5. Meanwhile, the driving signal generator 45 in FIG. 4 is disabled. Thus, the driving signal generator 45 is not shown in FIG. 5. The sensing electrode array of the touch panel 44 of the touch control sensing system 5 in FIG. 5 has sensing lines S1, S2 and driving lines D1, D2 as an example, and the instant disclosure is not limited thereto.

The driving signal Driving_Sig of the touch panel 44 is provided from the active stylus 48. Each driving line and each sensing line of the touched area respectively generates the sensing signal Sensing_Sig and the driving line signal DrvLine_Sig. The MUX 42 transmits the sensing signals Sensing_S1 and Sensing_S2 to the control circuit 41 for the sensing electrode array in order at different times according to the control signal Control_Sig, and the MUX 43 transmits the driving line signals DrvLine_D1 and DrvLine_D2 of the touch panel 44 to the control circuit 41 for the sensing electrode array at different times. In other words, the control circuit 41 for the sensing electrode array receives the sensing driving line signals DrvLine_D1 and DrvLine_D2 and the sensing line signals Sensing_S1 and Sensing_S2 at different times.

When the touch panel 44 is not touched by the active stylus 48, no driving signal exists. When the touch panel 44 is touched by the active stylus 48, the active stylus 48 provides driving signal Driving_Sig to the driving lines of the touched area, and the corresponding sensing signals are generated on the sensing lines due to the field coupling. If the driving signal Driving_Sig is a sine wave signal, then the sensing signal is also substantially a sine wave signal. Thus, the sensing signals of the sensing lines and the driving line signals of the driving lines of the touched area are converted to the intensity signals by the signal intensity analyzer 412 after passing through the LNA 411. After the intensity signals pass through the switch 413 and the PGA 414, the intensity-phase frequency converter 415 can generate a corresponding phase frequency signal according to each intensity signal.

The phase frequency analyzing unit 416 receives the phase frequency signals converted from the sensing line signals and the driving line signals, and analyzes the phase frequency signal to obtain signal magnitude of each corresponding sensing line or driving line. The calculating and processing unit 47 detects signal variation of each corresponding sensing line or driving line according to the signal magnitude.

If the touch panel 44 is not touched, the phase frequency signal generated according to the sensing signals Sensing_S1 and Sensing_S2 of the sensing lines S1 and S2, and the driving line signals DrvLine_D1 and DrvLine_D2 of the driving lines D1 and D2 has higher frequency, greater phase, or a combination of both.

However, when the touched area is the area crisscrossed by the sensing line S2 and the driving line D2, a sine wave is induced on the sensing line S2 according to the driving signal Driving_Sig, and the driving line D2 receives the driving signal Driving_Sig to generate the driving line signal DrvLine_D2. Therefore, the driving line signal DrvLine_D2 of the driving line D2 and the sensing signal Sensing_S2 of the sensing line S2 are sine wave signals. Accordingly, the phase frequency signal generated according to the driving line signal DrvLine_D2 and the sensing signal Sensing_S2 has lower frequency, smaller phase, or a combination of both. In turn, the calculating and processing unit 47 can determine the area crisscrossed by the sensing line S2 and the driving line D2 as the touched area.

Furthermore, when the tool for touching the touch panel is an active stylus, the manner in which the intensity-to-phase frequency converter 415 generates the phase frequency signals according to the intensity signals is opposite to that when the tool for touching the touch panel is a finger of a user or is a passive stylus. In detail, if the intensity signal is greater, the phase frequency signal generated by intensity-to-phase frequency converter 415 has lower frequency, smaller phase, or a combination of both, or vice versa. Thus, the manner in which the calculating and processing unit 47 detects the touched area is unnecessary to change. However, the embodiment is not for restricting the instant disclosure. In another embodiment, the manner in which the intensity-to-phase frequency converter 415 generates the phase frequency signals is not different for and dependent on the tool used for touching the touch panel. Meanwhile, in such a case, the manner in which the calculating and processing unit 47 detects the touched area would be modified.

Figure 6:
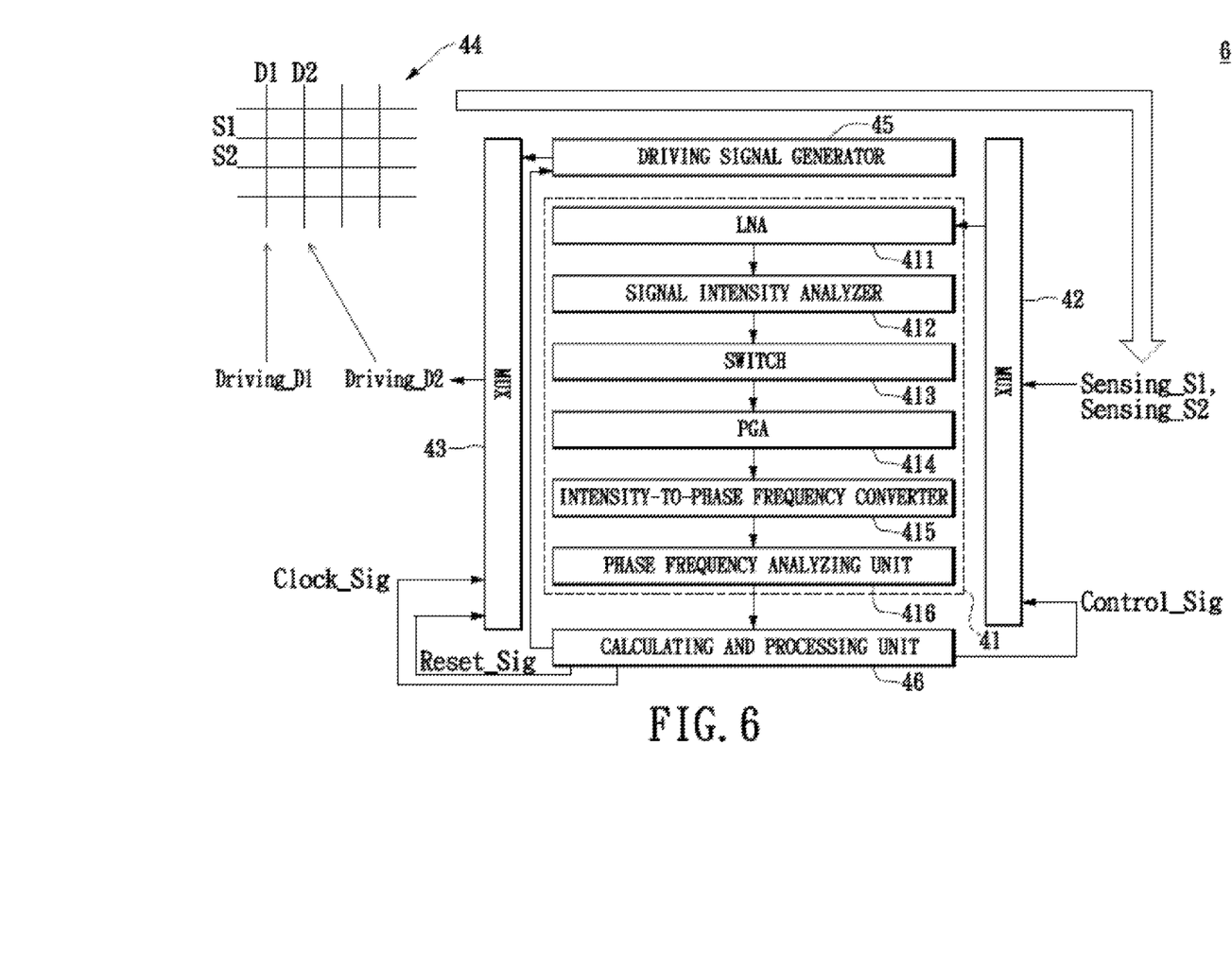
FIG. 6 shows an equivalent function block diagram of a touch control sensing system when the tool for touching the touch panel is a passive stylus or a finger of a user according to one embodiment of the present disclosure.

Please refer to FIG. 6, which shows equivalent function block diagram of a touch control sensing system when the tool for touching the touch panel is a passive stylus or is a finger of a user according to one embodiment of the present disclosure. When the tool for touching the touch panel is the passive stylus or the finger of the user, the touch control sensing system 4 can be equivalent to the touch control sensing system 6 in the FIG. 6. The sensing electrode array of the touch panel 44 of the touch control sensing system 6 in the FIG. 6 is using the sensing lines S1 and S2 and the driving lines D1 and D2 as an example. Thus, the MUX 43 outputs the driving signals Driving_D1 and Driving_D2, wherein the driving signal Driving_D1 and Driving_D2 are sine waves at times T1 and T2 respectively.

If the touch panel 44 is not touched, the sensing signals Sensing_S1 and Sensing_S2 of the sensing lines S1 and S2 are sine waves at times T1 and T2. At such a moment, the two Phase frequency signals generated according to the sensing signals Sensing_S1, Sensing_S2 at times T1 and T2 have higher frequencies, bigger phases, or a combination of both.

When the touched area is an area crisscrossed by the sensing line S1 and the driving line D2, the sensing signal Sensing_S2 of the sensing line S2 is a sine wave at times T1 and T2, and the sensing signal Sensing_S1 of the sensing line S1 is a sine wave at time T1. At such a moment, the phase frequency signal generated according to the sensing signal Sensing_S2 at times T1 and T2 has higher frequency, greater phase, or a combination of both. Also, the phase frequency signal generated according to the sensing signal Sensing_S1 at time T1 has higher frequency, greater phase, or a combination of both. The phase frequency analyzing unit 416 detects whether the frequency becomes lower, the phase becomes smaller, or that a combination of both occur. The calculating and processing unit 47 can then determine the area crisscrossed by the sensing line S1 and the driving line D2 as the touched area.

Figure 7:
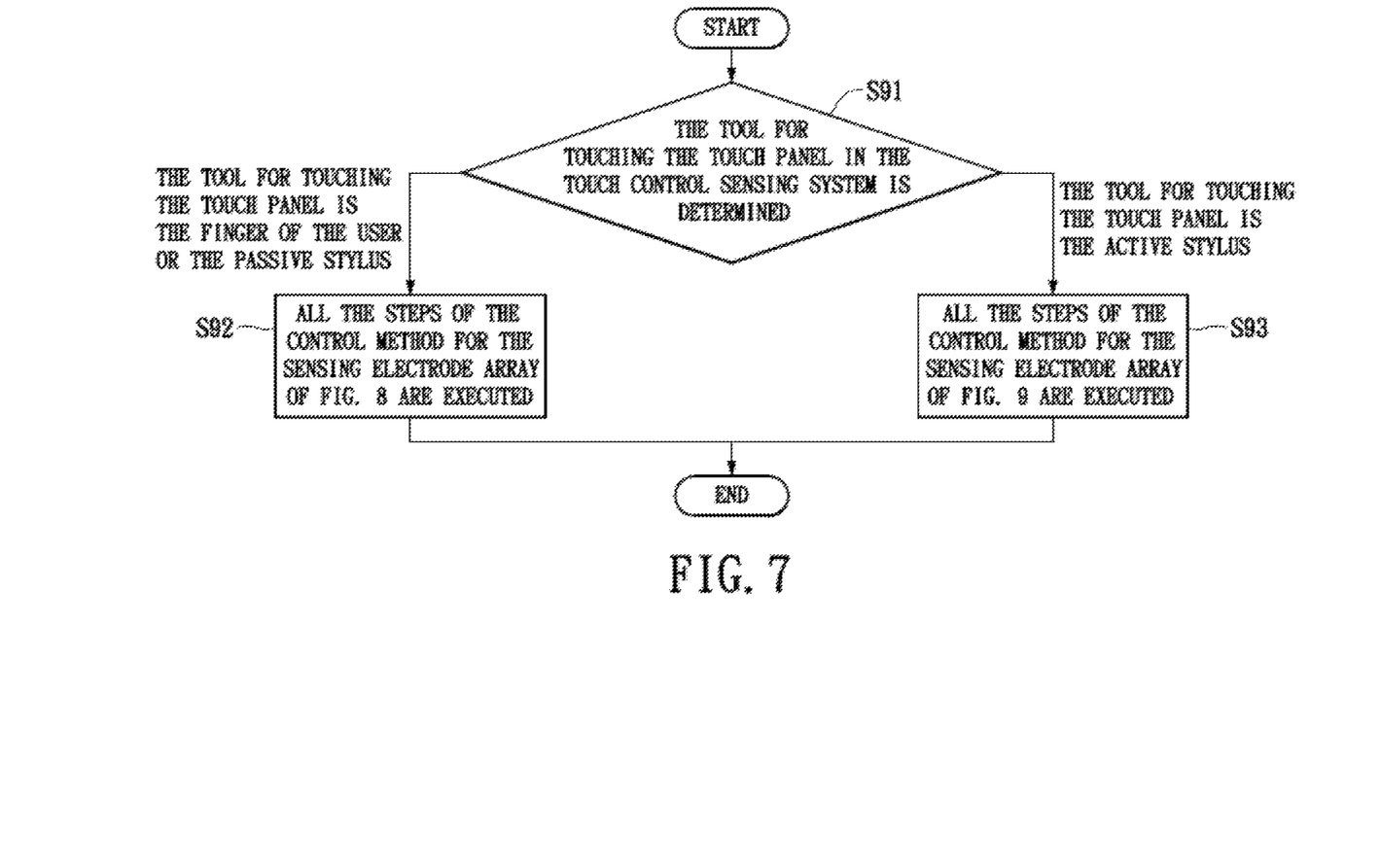
FIG. 7 shows a flow chart of a control method for a sensing electrode array according to one embodiment of the present disclosure.

Please refer to FIG. 7, which shows flow chart of a control method for a sensing electrode array according to one embodiment of the present disclosure. The control method for the sensing electrode array of FIG. 7 is applicable to the touch control sensing system with dual operation modes. The tool used for touching the touch panel in the proposed system may be a finger of a user, a passive stylus, or an active stylus.

First, in step S91, the tool for touching the touch panel is determined. If the tool is a finger of a user or is a passive stylus, then step S92 is executed. If the tool for touching the touch panel is an active stylus, then step S93 is executed.

Figure 8:
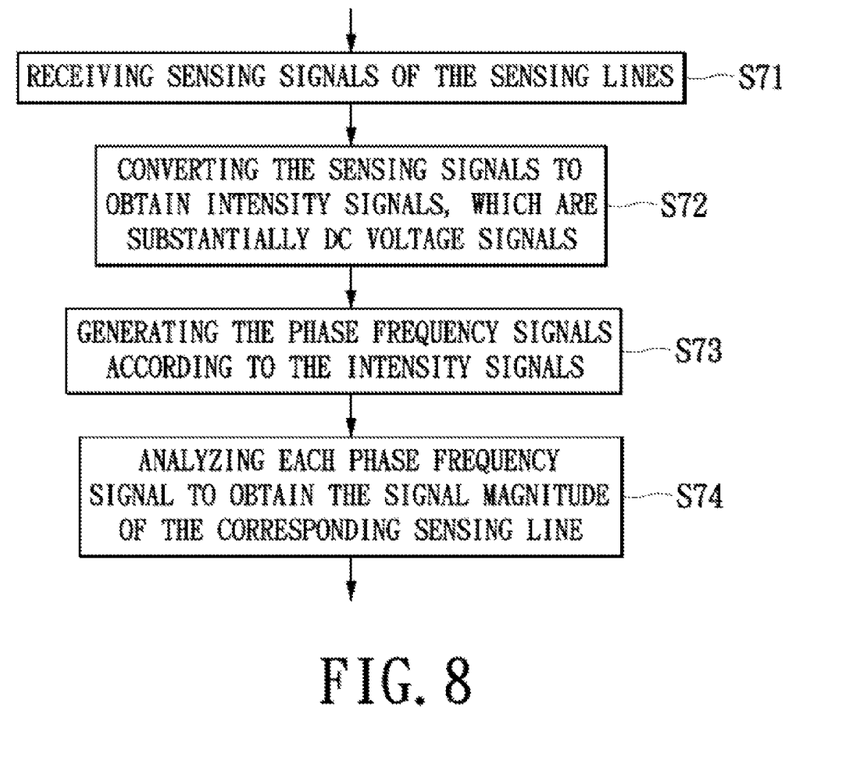
FIG. 8 shows a flow chart of the detailed steps of step S92 in the control method for the sensing electrode array according to one embodiment of the present disclosure.
Figure 9:
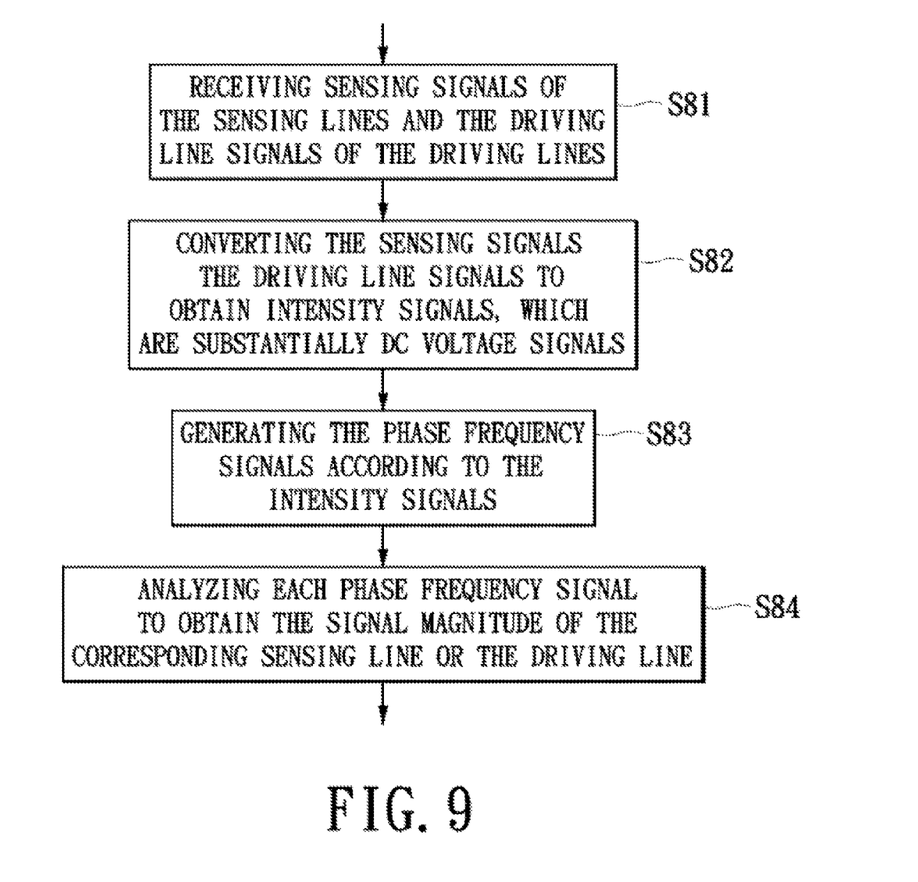
FIG. 9 shows a flow chart of the detailed steps of step S93 in the control method for the sensing electrode array according to one embodiment of the present disclosure.

In step S92, all the steps of the control method for the sensing electrode array of FIG. 8 are executed. In step S93, all the steps of the control method for the sensing electrode array of FIG. 9 are executed. The step S91, for example, can be implemented by a physical key switch. In other words, a user can manually operate the physical key to switch the type of touch tool used for touching the touch panel. However, the instant disclosure is not limited thereto.

Please refer to FIG. 8, which shows flow chart of the detailed steps of step S92 in the control method for the sensing electrode array according to one embodiment of the present disclosure. When the tool for touching the touch panel is a finger of a user or is a passive stylus which does not provide any driving signals, the driving signal generator of the touch control sensing system provides multiple driving signals to multiple driving lines of the touch panel.

First, in step S71, the sensing signals of the sensing lines are received. Next, in step S72, the sensing signals are converted to obtain intensity signals, which are substantially DC voltage signals, for example, the sensing signals are subjected to an envelope or peak detection to obtain the intensity signals. Notably, prior to step S72, the sensing signals can be subjected to the low-noise amplification before being converted to obtain the intensity signals.

Next, for step S73, the phase frequency signals are generated according to the intensity signals, wherein the phase, frequency, or a combination of both, for each phase frequency signal, would change according to the DC voltage level of the corresponding intensity signal. Prior to step S73, the intensity signals can be amplified individually to generate amplified intensity signals. Then, in step S73, phase frequency signals can be generated according to the amplified intensity signals.

Then, in step S74, each phase frequency signal is analyzed to obtain the signal magnitude of the corresponding sensing line.

Please refer to FIG. 9, which shows a flow chart of the detailed steps of step S93 in the control method for the sensing electrode array according to one embodiment of the present disclosure. When the tool for touching the touch panel is an active stylus, which is capable of providing a driving signal, the active stylus provides the driving signal to the touch panel of the touch control sensing system.

First, in step S81, the sensing signals of the sensing lines and the driving line signals of the driving lines are received. Next, in step S82, the sensing signals and the driving line signals are intensity to obtain intensity signals, which are substantially DC voltage signals, for example, the sensing signals and the driving line signals are subjected to an envelope or peak detection to obtain the intensity signals. Notably, prior to step S82, the sensing signals and the driving line signals can be subjected to the low-noise amplification before being intensity to obtain intensity signals.

Next, for step S83, phase frequency signals are generated according to the intensity signals, wherein the phase, frequency, or a combination of both, for each phase frequency signal would change according to the DC voltage level of the corresponding intensity signal. Prior to step S83, the intensity signals can be amplified individually to generate amplified intensity signals. Then, in step S83, phase frequency signals can be generated according to the amplified intensity signals. Then, in step S84, each phase frequency signal can be analyzed to obtain the signal magnitude of the corresponding sensing line or driving line.

Figure 10:
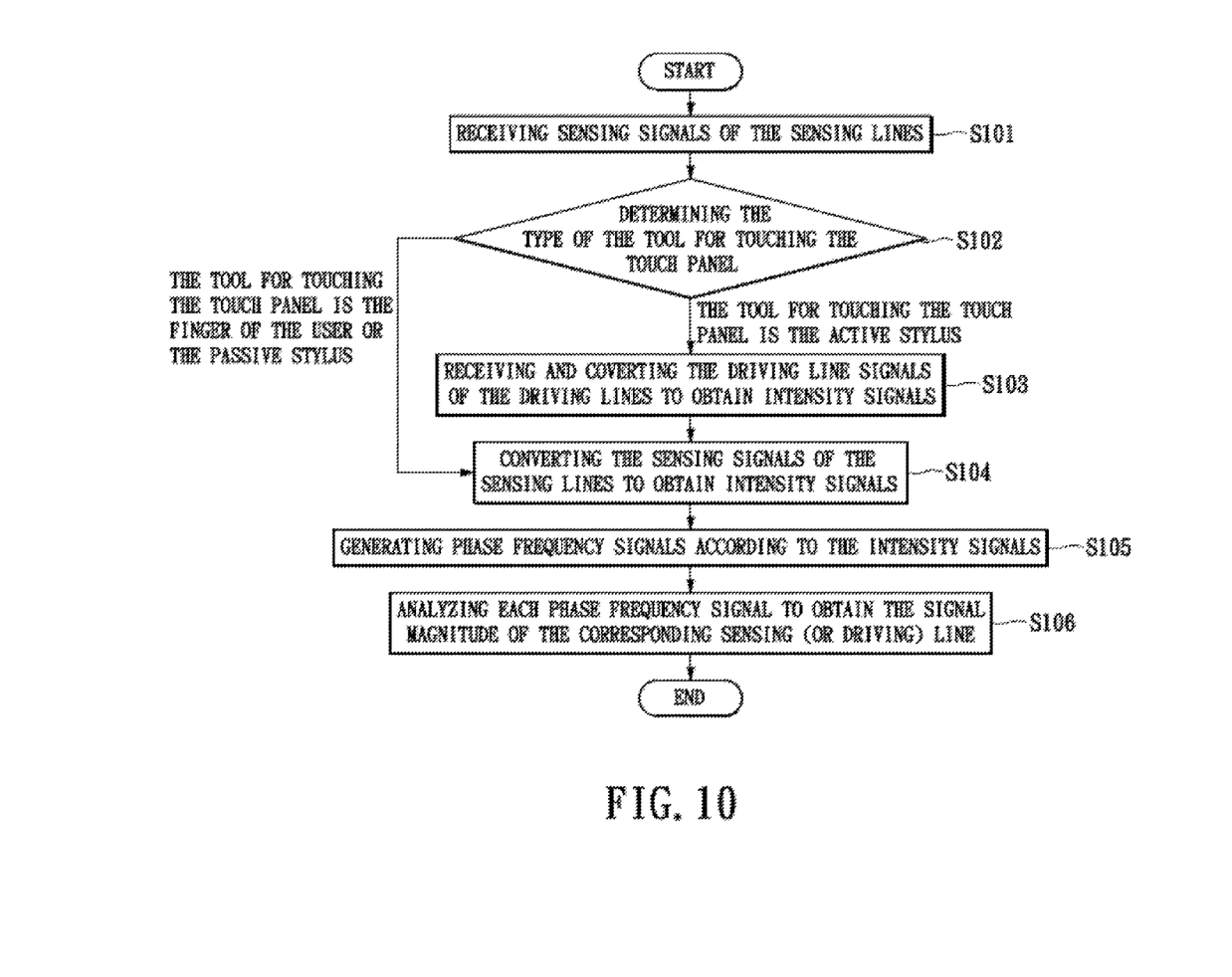
FIG. 10 shows a flow chart of a control method for a sensing electrode array according to another embodiment of the present disclosure.

Please refer to FIG. 10, which shows a flow chart of a control method for a sensing electrode array according to another one embodiment of the present disclosure. The control method for the sensing electrode array of FIG. 10 is applicable for the touch control sensing system with dual operation modes. Tool used for touching the touch panel can be a finger of a user, a passive stylus, or an active stylus.

First, in step S101, the sensing signals of the sensing lines are received. Next, in step S102, the type of the tool for touching the touch panel is determined. If the tool for touching the touch panel is a finger of a user or a passive stylus, step S103 is executed. If the tool for touching the touch panel is an active stylus instead, step S104 is executed. In step S102, the operating frequency and/or amplitude of the driving signal can be detected, so as to determine the type of the tool for touching the touch panel. For example, the frequency of the driving signal provided from an active stylus is 1 MHz, and from the driving signal generator is 250 KHz. Nevertheless, the instant disclosure is not restricted hereof.

In step S103, the driving line signals of the driving lines are received, and the driving line signals of the driving lines are processed to obtain intensity signals. Notably, prior to step S103, the driving line signals can be subjected to the low-noise amplification, before being converted to intensity signals.

In step S104, the sensing signals of the sensing lines are processed to obtain intensity signals. Likewise, prior to step S104, the sensing signals can be subjected to the low-noise amplification, before being intensity to obtain intensity signals.

In step 105, phase frequency signals are generated according to the intensity signals. The phase, frequency, or a combination of both, of each phase frequency signal would change according to the DC voltage level of the corresponding intensity signal. Prior to step S105, the intensity signals can be amplified individually to obtain amplified intensity signals. Thus, for step S105, phase frequency signals can be generated according the amplified intensity signals.

Then, in step S106, each phase frequency signal is analyzed to obtain the signal magnitude of the corresponding sensing (or driving) line.

To summarize the above descriptions, compared to the conventional touch control sensing system, the touch control sensing system using the control circuit for the sensing electrode array according to the instant disclosure has a higher SNR, and does not need an integrator, and therefore the touch control sensing system has faster operating speed. Furthermore, the touch sensing system using the control circuit for the sensing electrode array does not require a DAC for the baseline. Thus, the SNR is enhanced, and size of the touch panel can be medium or large.

Descriptions illustrated supra set forth simply explain the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A control circuit for a sensing electrode array, comprising:
    a signal intensity analyzer for converting a sensing signal of each sensing line of the sensing electrode array to an intensity signal, wherein said intensity signal is substantially a direct-current (DC) signal, and the signal intensity analyzer is a peak detector or an envelope detector;
    an intensity-to-phase frequency converter for converting said intensity signal to a phase frequency signal, wherein at least frequency or phase of said phase frequency signal is related to the level of said intensity signal; and
    a phase frequency analyzing unit for analyzing said phase frequency signal to obtain a signal magnitude.

2. The control circuit for the sensing electrode array of claim 1, wherein the intensity-to-phase frequency converter is a voltage-controlled oscillator (VCO), further wherein the phase frequency analyzing unit is a frequency counter or a frequency discriminator.

3. The control circuit for the sensing electrode array of claim 1, wherein the intensity-to-phase frequency converter is a phase modulator or a phase and frequency modulator, further wherein when the intensity-to-phase frequency converter is the phase modulator, the phase frequency analyzing unit is a phase demodulator, further wherein when the intensity-to-phase frequency converter is the phase and frequency modulator, the phase frequency analyzing unit is a phase and frequency demodulator.

4. The control circuit for the sensing electrode array of claim 1, wherein the signal intensity analyzer further converts a driving line signal of each driving line of the sensing electrode array to a driving intensity signal, the intensity-to-phase frequency converter converts the driving intensity signal to a driving phase frequency signal, and the phase frequency analyzing unit further analyzes the driving phase frequency signal to obtain a driving signal magnitude.

5. The control circuit for the sensing electrode array of claim 1, further comprising:
    a low-noise amplifier (LNA) for low-noise amplification of said sensing signal, wherein the signal intensity analyzer receives each low-noise amplified sensing signal and generates corresponding said intensity signal.

6. The control circuit for the sensing electrode array of claim 1, further comprising:
    a switch for delivering the intensity signals to a plurality of signaling channels; and
    a programmable gain amplifier (PGA) for adjusting the intensity signal propagated in each signaling channel, and transmitting the adjusted intensity signal to the intensity-to-phase frequency converter.

7. The control circuit for the sensing electrode array of claim 1, wherein the signal intensity analyzer converts the sensing signal of medium or high frequency to the intensity signal of low frequency.

8. A control method for a sensing electrode array, being used in a touch control sensing system, comprising:
    converting a sensing signal of each sensing line of the sensing electrode array to an intensity signal, wherein said intensity signal is substantially a DC signal;
    converting said intensity signal to a phase frequency signal, wherein at least frequency or phase of the phase frequency signal is related to the level of said intensity signal; and
    analyzing said phase frequency signal to obtain a signal magnitude.

9. The control method for the sensing electrode array of claim 8, wherein the intensity signal is generated based on the sensing signal subjected to peak detection or envelope detection.

10. The control method for the sensing electrode array of claim 8, wherein a VCO is used to receive the intensity signal to generate the phase frequency signal, and wherein a frequency counter or a frequency discriminator is used to obtain the signal magnitude based on said phase frequency signal.

11. The control method for the sensing electrode array of claim 8, wherein a phase modulator or a phase and frequency modulator is used to receive the intensity signal to generate the phase frequency signal, wherein if the phase frequency signal corresponding to the intensity signal is generated by the phase modulator, a phase demodulator is used to obtain the signal magnitude according to the phase frequency signal, and if the phase frequency signal corresponding to the intensity signal is generated by the phase and frequency modulator, a phase and frequency demodulator is used to obtain the signal magnitude according to the phase frequency signal.

12. The control method for the sensing electrode array of claim 8, further comprising:
    converting a driving line signal of each driving line of the sensing electrode array to a driving intensity signal;
    converting the driving intensity signal to a driving phase frequency signal; and
    analyzing the driving phase frequency signal to obtain a driving signal magnitude.

13. A touch control sensing system, comprising:
    a touch panel including a sensing electrode array; and
    a control circuit for the sensing electrode array, comprising:
    a signal intensity analyzer for converting a sensing signal of each sensing line of the sensing electrode array to an intensity signal, wherein the intensity signal is substantially a DC signal, and the signal intensity analyzer is a peak detector or an envelope detector;
    an intensity-to-phase frequency converter for converting said intensity signal to a phase frequency signal, wherein at least frequency or phase of said phase frequency signal is related to the level of said intensity signal; and a phase frequency analyzing unit for analyzing said phase frequency signal to obtain a signal magnitude.

14. The touch control sensing system of claim 13, wherein the intensity-to-phase frequency converter is a VCO, further wherein the phase frequency analyzing unit is a frequency counter or a frequency discriminator.

15. The touch control sensing system of claim 13, further comprising:

a micro controller unit for deciding signal magnitude variation of said each sensing line based on the signal magnitude generated by the phase frequency analyzing unit, so as to determine a region of the touch panel which a user touches.

16. The touch control sensing system of claim 15, wherein the control circuit for the sensing electrode array is adapted to the touch control sensing system with multiple operation modes, wherein the micro controller unit determines whether a tool for touching the touch panel is an active stylus providing a driving signal, a finger of a user, or a passive stylus.

17. The touch control sensing system of claim 16, wherein when the tool for touching the touch panel is the finger of the user or the passive stylus, the micro controller unit provides a plurality of driving signals to a plurality of driving lines of the touch panel, and when the tool for touching the touch panel is the active stylus, the micro controller unit provides a driving signal, further wherein the signal intensity analyzer obtains an intensity signal based on the driving signal of said each driving line.

18. The control method for the sensing electrode array of claim 8, wherein the step of converting a sensing signal of each sensing line of the sensing electrode array to an intensity signal further comprises converting the sensing signal of medium or high frequency to the intensity signal of low frequency by a signal intensity analyzer.

* * * * *